(12) United States Patent
Misawa

(10) Patent No.: US 9,894,264 B2
(45) Date of Patent: *Feb. 13, 2018

(54) IMAGING APPARATUS WITH DISPLAY AND IMAGE DISPLAY APPARATUS

(71) Applicant: FUJIFILM Corporation, Minato-ku, Tokyo (JP)

(72) Inventor: Atsushi Misawa, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/384,352

(22) Filed: Dec. 20, 2016

(65) Prior Publication Data

US 2017/0104923 A1    Apr. 13, 2017

Related U.S. Application Data

(60) Division of application No. 15/008,515, filed on Jan. 28, 2016, now Pat. No. 9,560,263, which is a division
(Continued)

(30) Foreign Application Priority Data

Dec. 9, 2004    (JP) .................................. 2004-357111

(51) Int. Cl.
*H04N 5/232* (2006.01)
*G03B 17/02* (2006.01)
(Continued)

(52) U.S. Cl.
CPC ......... *H04N 5/23216* (2013.01); *G03B 17/02* (2013.01); *G03B 17/38* (2013.01);
(Continued)

(58) Field of Classification Search
CPC ........... H04N 5/23293; H05N 5/23216; G03B 17/02; G03B 17/20
(Continued)

(56) References Cited

U.S. PATENT DOCUMENTS

| 4,825,209 A | 4/1989 | Sasaki et al. |
| 5,923,908 A | 7/1999 | Schrock et al. |

(Continued)

FOREIGN PATENT DOCUMENTS

| JP | 08336069 A | 12/1996 |
| JP | 10164401 A | 6/1998 |

(Continued)

OTHER PUBLICATIONS

Notification of Reasons for Refusal, dated Aug. 31, 2011, issued in related JP Application No. 2009-185553, 5 pages in English and Japanese.

(Continued)

*Primary Examiner* — Christopher Mahoney

(74) *Attorney, Agent, or Firm* — Sughrue Mion, PLLC

(57) ABSTRACT

A digital camera is provided with a vertically long camera body having an approximately rectangular solid shape. An LCD panel provided in a rear surface of the camera body is arranged such that longitudinal directions of the display screen and the camera body correspond to each other. The digital camera is operated through a touch panel provided in a lower portion of the display screen. In a taking mode, an image is displayed in a small size on an upper portion of the display screen. In reproducing, the camera body is rotated sideways by 90 degree. In a reproducing mode, display posture of the image is also rotated by 90 degree, and the image is displayed in a large size on the entire display screen.

5 Claims, 6 Drawing Sheets

Related U.S. Application Data of application No. 14/694,264, filed on Apr. 23, 2015, now Pat. No. 9,282,251, which is a continuation of application No. 14/311,469, filed on Jun. 23, 2014, now Pat. No. 9,042,718, which is a division of application No. 14/148,993, filed on Jan. 7, 2014, now Pat. No. 8,886,030, which is a division of application No. 13/365,677, filed on Feb. 3, 2012, now Pat. No. 8,655,164, which is a division of application No. 13/241,390, filed on Sep. 23, 2011, now Pat. No. 8,457,486, which is a division of application No. 12/706,202, filed on Feb. 16, 2010, now Pat. No. 8,050,550, which is a division of application No. 11/296,334, filed on Dec. 8, 2005, now Pat. No. 7,706,681.

(51) Int. Cl.
*G03B 17/38* (2006.01)
*H04N 5/378* (2011.01)
*H04N 5/372* (2011.01)

(52) U.S. Cl.
CPC ......... *H04N 5/23293* (2013.01); *H04N 5/372* (2013.01); *H04N 5/378* (2013.01)

(58) Field of Classification Search
USPC ....... 396/373–375, 535; 348/333.01, 333.02, 348/333.03, 333.04, 333.05, 333.06
See application file for complete search history.

(56) References Cited

U.S. PATENT DOCUMENTS

| | | | |
|---|---|---|---|
| 6,377,302 B1 | 4/2002 | Ozaki et al. | |
| 6,388,657 B1 | 5/2002 | Natoli | |
| 6,919,927 B1 | 7/2005 | Hyodo | |
| 7,046,286 B1 | 5/2006 | Kobayashi et al. | |
| 7,095,442 B2 * | 8/2006 | van Zee | G06F 1/1626 |
| | | | 348/333.01 |
| 7,551,223 B2 | 6/2009 | Tanaka | |
| 7,706,681 B2 | 4/2010 | Misawa | |
| 7,708,641 B2 | 5/2010 | Tawara | |
| 8,655,164 B2 | 2/2014 | Misawa | |
| 9,560,263 B2 * | 1/2017 | Misawa | G03B 17/02 |
| 2001/0014214 A1 | 8/2001 | Hayashi et al. | |
| 2001/0012065 A1 | 9/2001 | Ejima et al. | |
| 2002/0024602 A1 | 2/2002 | Juen | |
| 2002/0171747 A1 | 11/2002 | Niikawa et al. | |
| 2003/0052985 A1 | 3/2003 | Oya et al. | |
| 2004/0174455 A1 | 9/2004 | Soga | |
| 2004/0239792 A1 | 12/2004 | Shibutani et al. | |

FOREIGN PATENT DOCUMENTS

| | | |
|---|---|---|
| JP | 11164175 A | 6/1999 |
| JP | 11252427 A | 9/1999 |
| JP | 11289484 A | 10/1999 |
| JP | 2000101876 A | 4/2000 |
| JP | 2000101879 A | 4/2000 |
| JP | 2001257912 A | 9/2001 |
| JP | 2004205885 A | 7/2004 |
| JP | 2004340991 A | 12/2004 |

OTHER PUBLICATIONS

Notification of Reasons for Refusal, dated Nov. 22, 2011, issued in related JP Application No. 2009-185553, 7 pages in English and Japanese.

Notification of Reasons for Refusal, dated Mar. 14, 2012, issued in corresponding JP Application No. 11-285646, 5 pages in English and Japanese.

* cited by examiner

IMAGING APPARATUS WITH DISPLAY AND IMAGE DISPLAY APPARATUS

This is a divisional of U.S. application Ser. No. 15/008,515, filed Jan. 28, 2016, which is a divisional of U.S. application Ser. No. 14/694,264, filed Apr. 23, 2015, now U.S. Pat. No. 9,282,251, which is a continuation of application Ser. No. 14/311,469, filed Jun. 23, 2014, now U.S. Pat. No. 9,042,718, which is a divisional of application Ser. No. 14/148,993, filed Jan. 7, 2014, now U.S. Pat. No. 8,886,030; which is a divisional of application Ser. No. 13/365,677, filed Feb. 3, 2012, now U.S. Pat. No. 8,655,164; which is a divisional of application Ser. No. 13/241,390, filed Sep. 23, 2011, now U.S. Pat. No. 8,457,486; which is a divisional of application Ser. No. 12/706,202, filed Feb. 16, 2010, now U.S. Pat. No. 8,050,550; which is a divisional of application Ser. No. 11/296,334, filed Dec. 8, 2005, now U.S. Pat. No. 7,706,681, which claims priority of Japanese Patent Application 2004-357111, filed on Dec. 9, 2004. The entire disclosures of the prior applications are considered part of the disclosure of the accompanying divisional application and are hereby incorporated by reference.

BACKGROUND OF THE INVENTION

1. Field of the Invention

The present invention relates to an imaging apparatus with display and an image display apparatus, and more particularly to an imaging apparatus with display and an image display apparatus in which a horizontally long display is provided in a main body.

2. Description of the Related Arts

There has been known a digital camera in which an image taken by an image sensor such as a CCD is converted into digital data to be stored in a memory. A display such as an LCD is provided in a rear surface of a camera body of the digital camera. The display functions as an electronic viewfinder for through-displaying a live image of a subject in a taking mode, while it reproduces and displays the recorded images read out from the memory in a reproducing mode.

The camera body is downsized and becomes thinner with the spread of the digital camera; meanwhile, a display screen is getting larger in order to enhance the visibility and to display a powerful image. When the display screen is larger, it occupies more area on a rear surface of the camera body inevitably, so that a grip space for holding the camera body must get smaller relatively. When the camera body is held tightly, the display screen is partially covered by the hand holding the camera body. Accordingly, despite the large display screen, a part of the image is not watched.

In order to solve the above problem, in the camera disclosed in Japanese Patent Laid-Open Publication No. 11-289484, the recorded image is displayed on the entire display screen in the reproducing mode, while the image to be taken in the taking mode is displayed slightly smaller than the image in the reproducing mode, so that a part of the display screen used as a grip will become a blank area on which the image is not displayed.

This type of cameras have a camera body of approximately rectangular solid shape are usually a horizontal type. In the horizontal type of camera, horizontally long posture in which the camera body is laid down so as to approximately correspond the longitudinal direction of the camera body to the horizontal direction is normal posture. The normal posture of the camera body is posture in which the image having normal aspect ratio (horizontal to vertical ratio) of 4:3 for example, can be taken in the horizontally long posture (a so-called horizontal position). In such a horizontal type camera, in the taking mode one end in the horizontal direction of the camera body is grasped so as to be wrapped by one hand, and then held. Additionally, since the camera body is horizontally long, the other end is easily held by another hand, and the camera body can be held stably by both hands.

In the horizontal type camera, since a left side end port ion of the camera body viewed from the front side is a grip position, a grip space is positioned in the right side as viewed from the rear surface. Accordingly, the blank area is set in the right side of the display screen, and the display size of the image becomes smaller than the size of the entire display screen. The image is displayed on the upper left side of the display screen. In the reproducing mode, the image can be reproduced in a state that the camera body is put on a table or on the hand, so that it is unnecessary to ensure the grip space as in the taking mode, and the recorded image is displayed on the entire display screen. Thereby, it is possible to watch the powerful images on the large-sized screen.

According to the market research conducted recently by the present assignee, the camera body is more often held with one hand as it is getting smaller and thinner, and the research shows that a vertical type of camera in which the normal posture is a vertically long (the longitudinal direction of the camera body approximately corresponds to the vertical direction) can be held more stably than the horizontal type which is conventionally used. The reason for that is considered as follows. When the camera body is held with one hand, a side end portion in the horizontal direction of the camera body is gripped to hold the horizontal type camera; meanwhile, a lower portion of the camera body is gripped to hold the vertical type camera. Thereby, the camera body is easily held at a position near the barycentric position of the camera body, so that fluctuation of the camera body is prevented.

Although the vertical type is easier to hold than the horizontal type in the taking mode, the camera body of the vertical type is narrower than the horizontal type, and makes it difficult to increase the width of the display. The display size is not a serious problem in the taking mode in which the display is used for framing; however, it should be as large as possible in order to show visually appealing images in the reproducing mode.

When the image having the horizontally long aspect ratio is displayed on the display screen of the camera or the image display apparatus having the horizontally long display, and if the display direction is fixed in these camera and apparatus, it is impossible to correspond to the change of the posture of the apparatus body, it is inconvenient in many cases.

SUMMARY OF THE INVENTION

A primary object of the present invention is to provide a vertical type of an imaging apparatus with display which can enlarge a size of a display screen in a reproducing mode.

Another object of the present invention is to enhance the convenience of an image display apparatus with a horizontally long display.

In order to achieve the above and other objects, an imaging apparatus is provided with a display controller for switching between a first displaying mode and a second displaying mode. In the first displaying mode, an image having a horizontally long aspect ratio obtained with an image sensor is displayed on a display such that the long side of the image is perpendicular the long side of the display having a screen of an approximately rectangular shape. In the second displaying mode, the image in the first displaying mode is rotated by 90 degree, and the image is displayed on the display such that the long sides of the image and the display approximately correspond to each other.

In a preferable embodiment of the present invention, the display controller selects the first displaying mode in a taking mode for taking the images with the image sensor, while selects the second displaying mode in a reproducing mode for reproducing the recorded images. In the first displaying mode, a live image is displayed on the display. In the second displaying mode, the recorded image read out from a recording medium is reproduced and displayed on the display. In the second displaying mode, the image is displayed on the entire display screen of the display. In the first displaying mode, the image is displayed such that the long sides of the image approximately correspond in length to the short sides of the display screen while maintaining the aspect ratio of the image. Thereby, a blank area where the image is not displayed on the display screen is generated.

An image display apparatus with display of the present invention is provided with a display controller for switching between a first displaying mode and a second displaying mode. In the first displaying mode, the image having horizontally long aspect ratio is displayed on a display such that the long side of the image is perpendicular to the long side of the display having a screen of an approximately rectangular shape. In the second displaying mode, the image in the first displaying mode is rotated by 90 degree, and the image is displayed on the display such that the long side of the image and the display approximately correspond to each other.

According to the present invention, when the image having the horizontally long aspect ratio is displayed on the horizontally long display screen, it is possible to switch between the first displaying mode in which the long sides of the image and the display screen are perpendicular to each other and the second displaying mode in which the long sides approximately correspond to each other, so that in the second displaying mode the large display screen can be utilized effectively to display a large picture frame.

BRIEF DESCRIPTION OF THE DRAWINGS

The above and other subjects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE PREFERRED EMBODIMENTS

Figure 1:
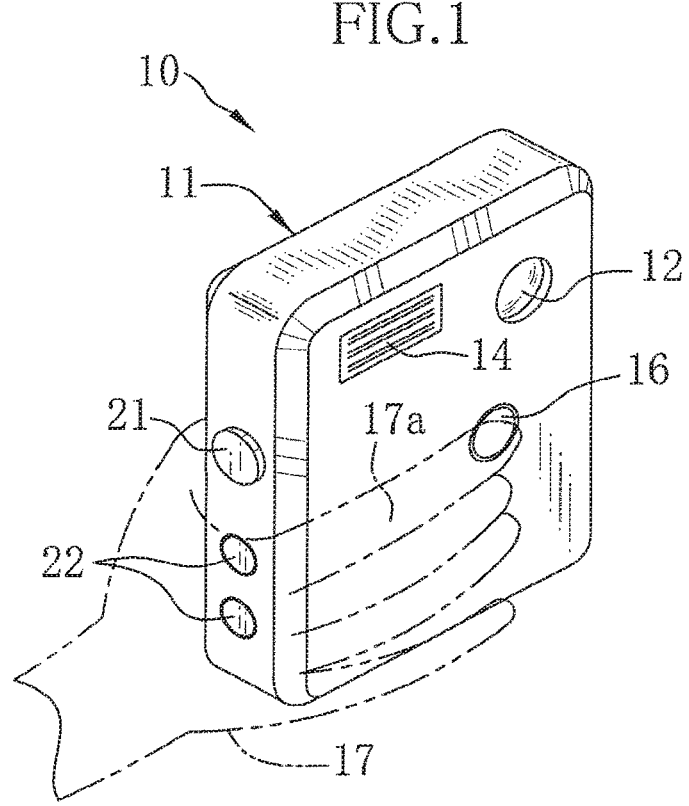
FIG. 1 is a front perspective view of a digital camera to which the present invention is applied.
Figure 2:
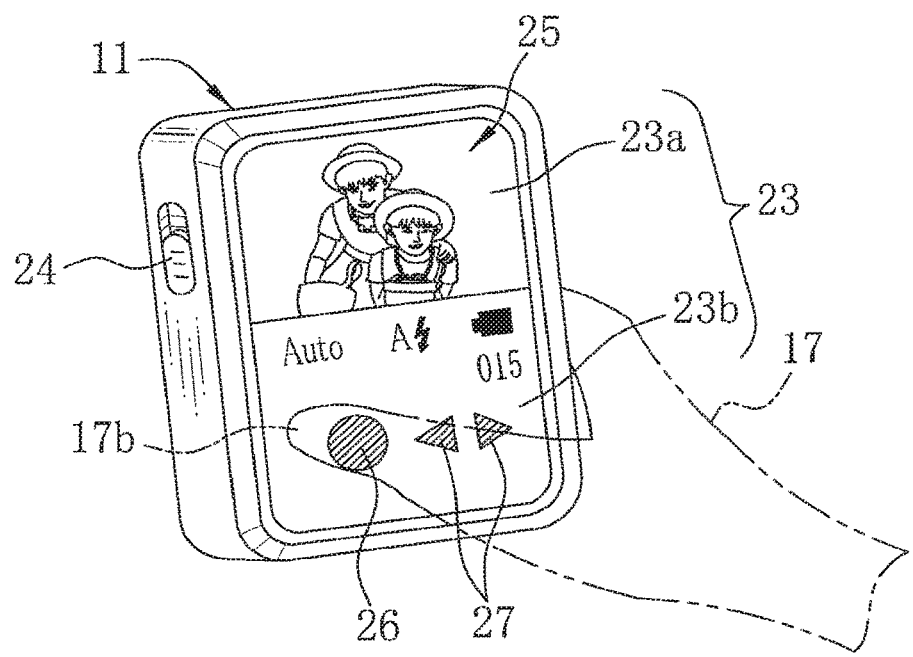
FIG. 2 is a rear perspective view of the digital camera.

In FIGS. 1 and 2, a digital camera 10 is a vertical type of camera in which the longitudinal length is longer than the horizontal length. To take images, the vertical type of camera usually has normal posture in which a longitudinal side of a camera body 11 having an approximately rectangular solid shape stands upright. In a taking mode, a lower portion of the camera body 11 is gripped by for example a user's hand 17. A taking lens 12 and a flash emitter 14 are provided in an upper portion of a front surface of the camera body 11, and a release button 16 is provided in the central portion thereof. The release button 16 is arranged so as to be easily operated by an index finger 17a of the hand 17. In the digital camera 10, when an image taken in the normal posture, a horizontally long image having normal aspect ratio of 4:3 is obtained.

Figure 4:
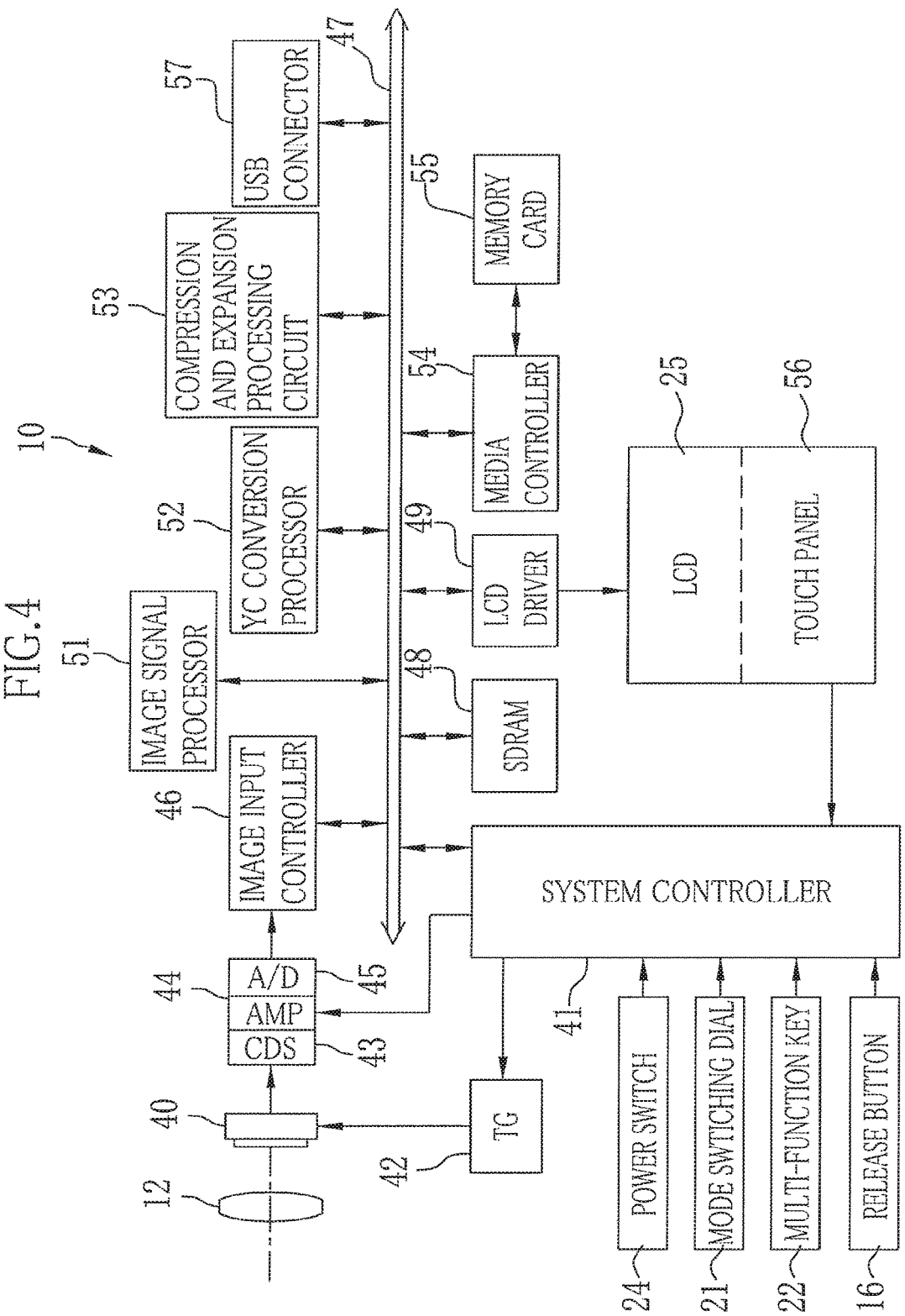
FIG. 4 is a schematic block diagram showing electric structure of the digital camera.

As is well known, a card slot (not shown) and a USB connector (see. FIG. 4, numeral 57) are formed on a bottom surface of the camera body 11. A memory card (see. FIG. 4, numeral 55) for storing image data is inserted into the card slot removably. The USB connector transfers the image data in the memory card to an external apparatus such as a PC.

A mode switching dial 21 and a multifunction key 22 are provided in one side of the camera body 11. The mode switching dial 21 switches between operation modes of the digital camera 10, such as a taking mode for recording the image in the memory card, a reproducing mode for reproducing the recorded image stored in the memory card, and a set-up mode for performing various settings. The multifunction key 22 is operated to change a function assigned to each operation mode. For example, the multifunction key 22 is operated as a zoom key in the taking mode while operated as a frame switching key in the reproducing mode, and as a cursor moving key on a setting screen in the set-up mode. A power switch 24 is provided in the other side of the camera body 11.

An LCD (Liquid Crystal Display) panel 25 on which the image, a set-up menu, and so forth is displayed is provided on a rear surface of the camera body 11. In the taking mode, the LCD panel 25 is operated as an electronic viewfinder for displaying a through-the-lens image of a subject in real time, while in the reproducing mode it is operated as a reproduction monitor on which the image recorded in the memory card is reproduced and displayed. Meanwhile, in the set-up mode, various setting screens are displayed on the LCD panel 25.

The LCD panel 25 has a display screen 23 with an approximately rectangular shape, and is arranged so that its long side corresponds to that of the camera body 11. The ratio between a long side and short side of the display screen has approximately the same aspect ratio (horizontal to vertical ratio) of the image. When the camera body 11 is rotated sideways by 90 degree from the normal posture, the display screen 23 is horizontally long and suitable to view the horizontal images.

When the camera body 11 is in the normal posture, the direction of the display screen 23 is vertically long. In the taking mode, an upper area of the display screen 23 is used as an image display area 23a, on which the live image (through image) of the subject is displayed. The image is displayed on the image display area 23a such that the long sides of the image approximately correspond to the short sides of the display screen 23 while maintaining the aspect ratio of, for example, 4:3.

In the taking mode, a lower area of the display screen 23 is a blank area 23b on which the image is not displayed. When the digital camera 10 is in the normal posture, the lower portion of the camera body 11 is gripped, and thus the blank area 23b becomes a grip space. Since the image is not displayed on the grip space, it is not hidden by the hand 17 gripping the camera body 11 in framing.

Various kinds of information such as taking condition and the number of image taken are displayed on the blank area 23b. Specifically, such information would be, for example, a selected taking mode (e.g. a distant view mode, a close-up mode, a portrait mode, or an auto mode), the kind of flash emitting modes (e.g. a red-eye reducing mode, a forced flash mode, or a flash off mode), and the remaining battery power. In addition, an f-number and shutter speed may be displayed on the blank area 23b.

A touch panel (see. FIG. 4, numeral 56) for inputting an operation signal is provided in the blank area 23b, and used as an operating section of the digital camera 10.

In the taking mode, the blank area 23b will display a release key 26 and zoom key 27 whose operation signals are input through the touch panel that has switches arranged to face the release key 26 and the zoom key 27. In addition, other key such as a mode switching key may be provided as the operating section on the blank area 23b. Since a first finger 17b of the hand 17 is on the blank area 23b, each operation key is arranged so as to be easily operated with the first finger 17b. Both the combination of the release key 26 and the zoom key 27, and that of the release button 16 and the multifunction key 22 are effective so that a user can select either one of the combinations in which the user operates easier. Alternatively, one combination may be made effective, while another one may be made ineffective.

Figure 3:
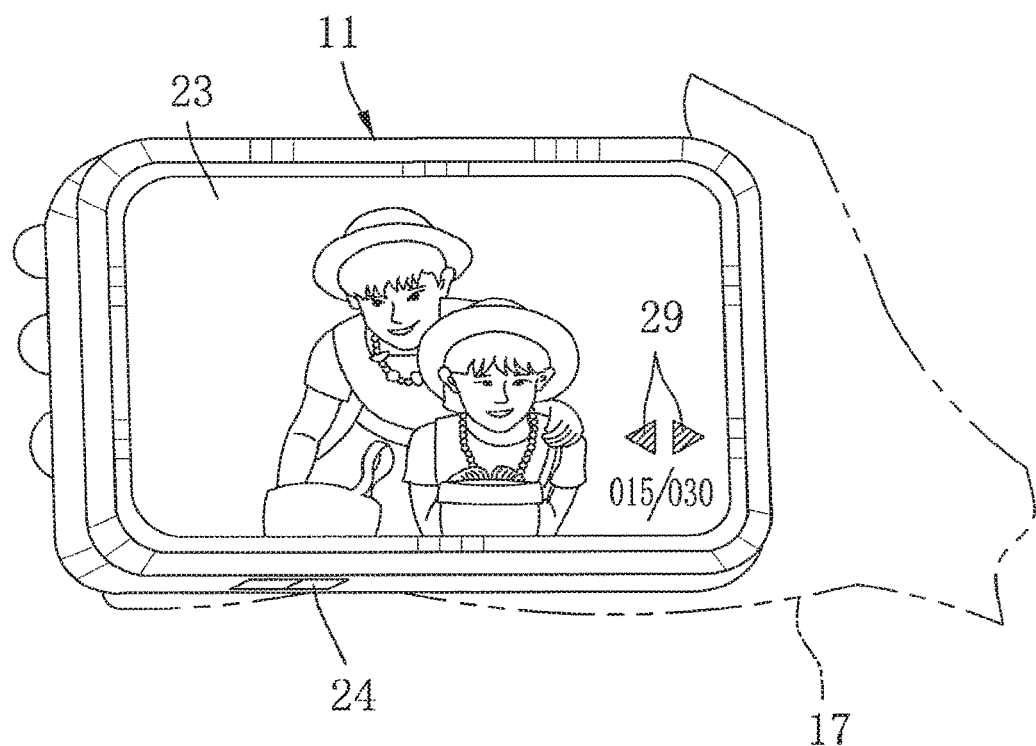
FIG. 3 is a rear view of the digital camera in horizontal posture.

As shown in FIG. 3, when reproducing the images, the camera body 11 is usually rotated by 90 degree from the normal posture. When the camera body 11 in the normal posture is turned horizontally, the display screen 23 becomes horizontally long. In the reproducing mode, the entire area of the display screen 23 is the image display area. Display posture of the image in the taking mode is rotated by 90 degree, and the image is enlarged so that the long sides of the image and the display screen correspond with each other. Thereby, the image is displayed on the entire display screen 23, and it becomes possible to make the reproduced image more visually appealing.

In the taking mode, the digital camera 10 is put on the palm of the hand 17 or a table. Therefore, the display screen 23 is not covered by the hand 17.

In the reproducing mode, the multifunction key 22 is operated as a frame changing key. When the plural images are stored in the memory card, the recorded image to be displayed on the display screen 23 is changed by operating the multifunction key 22. The total number of the recorded images ("030") read out from the memory card and the frame number of the displayed image ("015") are displayed in a lower light area of the display screen 23.

A frame changing key 29 is displayed above the frame number. The aforementioned touch panel is provided in the right side of the display screen 23 (an area corresponding to the lower portion when the camera body 11 is in the normal posture), and works with the frame changing key 29. The reproduced image can also be changed by operating the frame changing key 29.

In FIG. 4, a CCD 40 is provided behind the taking lens 12. The CCD 40 has an imaging surface on which subject light passing through the taking lens 12 is focused, and converts the subject light received on the imaging surface into electric signals. The CCD 40 is driven by a timing generator (TG) 42. A system controller 41 controls the overall operation of the digital camera 10 in response to the input of the operation signal.

In the taking mode, the system controller 41 controls the TG 42 to generate a timing signal (clock pulse). The CCD 40 is driven by the timing signal (clock pulse) input from the TG 42.

The image signal output from the CCD 40 is input in a correlation double sampling circuit (CDS) 43 to be sampled. The image signal output from the CDS 43 is amplified by an amplifier (AMP) 44, and then converted into digital image data by an A/D converter (A/D) 45.

The image data is temporarily stored in an SDRAM (internal memory) 48 by the image input controller 46. An image signal processor 51 accesses the image data stored in the SDRAM 48 to apply various kinds of image processing including gradation conversion, white-balance correction, and γ-correction processing. A YC conversion processor 52 converts the image data to which the image processing is applied into a luminance signal Y and color difference signals Cr, Cb.

In the taking mode, the CCD 40 images the subject at a predetermined frame rate. The image processing is applied to the obtained image data, and the image data is displayed on the LCD panel 25 as the live image. The LCD panel 25 is driven by an LCD driver 49. The LCD driver 49 is provided with an image memory and a D/A converter. The processed image data temporarily accumulated in the image memory is converted into, for example, an NTSC analog signal by the D/A converter to be output to the LCD panel 25.

When the releasing operation is performed, the CCD 40 obtains main image data which has more pixels than the displayed live image. The abovementioned image processing is applied to the main image data, and in addition, compression processing of a predetermined compression format (e.g. JPEG format) is applied thereto. The main image data to which the compression processing is applied is recorded in a memory card 55 through a media controller 54.

In the reproducing mode, the main image data read out from the memory card 55 is written in the SDRAM 48. Then, after expansion processing is applied to the main image data by a compression and expansion processing circuit 53, the image data is output to the LCD driver 49 to be reproduced and displayed on the LCD panel 25.

The system controller 41 controls the display posture and size of the image through the LCD driver 49. Namely, since the upper area of the display screen 23 (the image display area 23a) is used for displaying the image in the taking mode, so that the display size is adjusted so that its long sides (length in a longitudinal direction) correspond to the short sides of the display screen 23. Moreover, the image is displayed in a direction that the longitudinal direction of the display screen 23 is perpendicular to the longitudinal direction (horizontal direction) of the image. Thereby, up, down, left, and right sides of the camera body 11 and the displayed image correspond to each other when the camera body 11 is in the normal posture (see FIG. 2).

In the reproducing mode, the display size of the image is enlarged so as to fill the entire display screen 23, and the display posture of the image is rotated by 90 degree from the posture in the taking mode so that the long sides of the display screen 23 correspond to the long sides (horizontal direction) of the image. Thereby, up, down, left, and right of the camera body 11 and the displayed image correspond to each other when the camera body 11 is turned sideways from the normal posture (see FIG. 3).

A touch panel 56 is operated for inputting the operation signal to the system controller 41 together with the release button 16 and the multifunction key 22. There are two types of the touch panel 56 according to the arrangement, one of which is disposed under the display screen 23 and the other arranged on the display screen 23. As a method of detecting the contact to the display screen 23, a pressure sensitive type for detecting the change in pressure on the panel and an electrostatic type for detecting an electronic signal by static electricity may be applied to the present embodiment.

A USB connector 57 is connected with an external apparatus such as a PC through a cable, and is a communication interface for transferring the image data recorded in the memory card 55 and importing the data from the external apparatus.

Next, the operation of the above structure is explained. When the image is taken, the taking mode is selected by the mode switching dial 21. Then, as shown in FIGS. 1 and 2, the camera body 11 is put in the normal posture, and the lower portion thereof is gripped. Since the digital camera 10 is the vertical type, it can be held stably by such a grip method. In the taking mode, the live image is through-displayed on the image display area 23a such that its horizontal direction (longitudinal direction) is perpendicular to the longitudinal direction of the display screen 23. Since the lower portion of the image display area 23a becomes the blank area 23b, the live image is not hidden, even partially, by the hand 17. After framing with watching the image display area 23a, the releasing operation is performed by depressing the release button 16 or the release key 26. After releasing, the main image data is stored in the memory card 55.

When the taken image is reproduced, the reproducing mode is selected by operating the mode switching dial 21, and as shown in FIG. 3, the camera body 11 is rotated sideways by 90 degree from the normal posture. When the reproducing mode is selected, the recorded image read out from the memory card 55 is displayed on the display screen 23. In the reproducing mode, the direction the image is also rotated by 90 degree from that in the taking mode, and the image fills the entire display screen 23 with its long sides (longitudinal direction) corresponding to the longitudinal direction of the display screen 23. Thereby, it is possible to display the large size of image.

The type and layout of the above-mentioned operation keys in the display screen can be suitably changed. For instance, since the appropriate layout of the operation keys is different between a right-handed user and a left-handed user, the different layout settings may be established for the right and left handed. In this case, the system controller changes the position of the operation keys based on setting information to switch the layout. In the above embodiment, since the image is displayed on the entire display screen in the reproducing mode, the display size is larger than in the taking mode. Alternatively, the image may be displayed on a part of the display screen, such as 80% of the screen. In addition, when the user desires to confirm the recorded image by reproducing and displaying it for a while immediately after taking the image, the reproduced image may be displayed in the same posture as the live image because it troublesome to turn the camera body horizontally, In the above embodiment, the blank area is used as an area for displaying various kinds of information and used as an operating section by displaying the operation key and providing the touch panel. The blank area may be used as only a blackout grip space instead. In addition, when the blank area is not provided, the lower area (corresponding to the blank area) of the display screen may be used as the image display area by displaying the entire image on the upper portion of the display screen and displaying a part of the image in an enlarged size on the lower portion, for example.

Moreover, in the above embodiment, although the touch panel is provided in the blank area in addition to the operation members (release button, multifunction key, and the like) provided in the camera body, either one may be provided. When only the touch panel is provided for inputting the operation signal, since it is unnecessary to provide the operation members in the camera body, irregularities of the surface of the camera body is eliminated to enhance the design properties.

Figure 5:
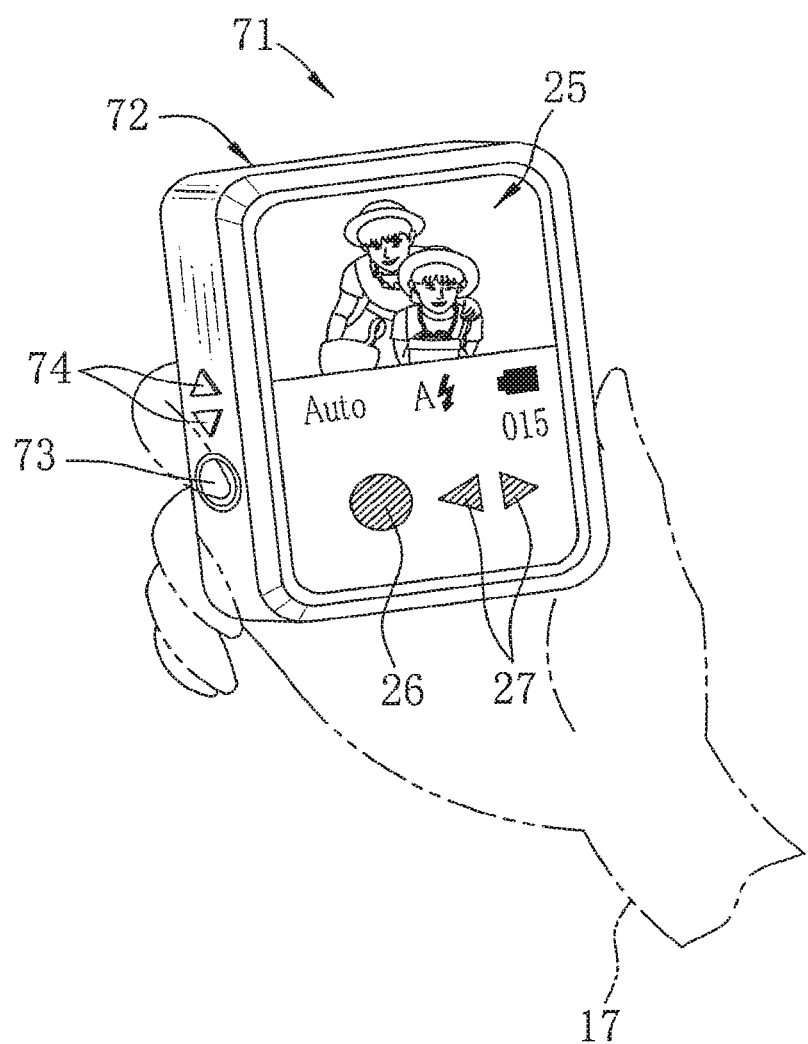
FIG. 5 is a rear perspective view of a digital camera in which a release button and a multifunction key are arranged on the side surface.

The layout of the operation member provided in the camera body can be changed in accordance with the grip position and so forth. As shown in FIG. 5, when a digital camera 71 is held, a front surface of a camera body 72 may be covered with the hand 17, and both side surfaces are gripped by fingers. In this case, a release button 73 and a multifunction key 74 may be arranged in one side surface of the camera body 72 so that the release operation and the zoom operation can be performed with the finger positioned on the side surface of the camera body 72. Note that the components same as those in the above embodiment are represented by the same numerals in FIG. 5.

Figure 6A:
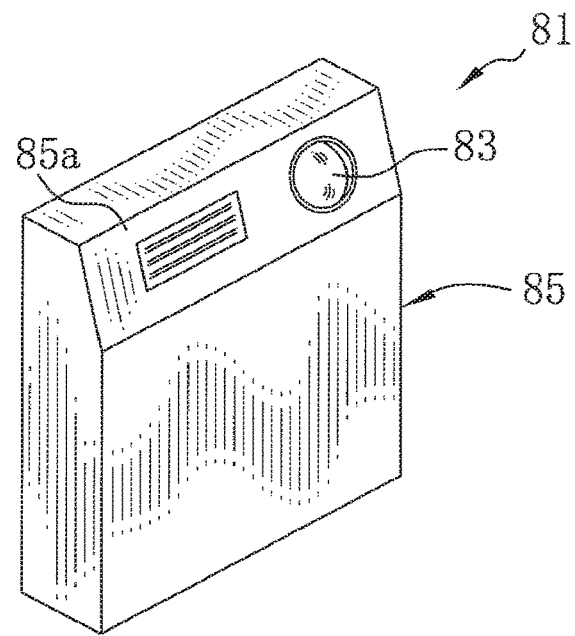
FIGS. 6A and 6B are a front perspective view and a side view of a digital camera in which a taking lens is arranged to be directed upward.
Figure 6B:
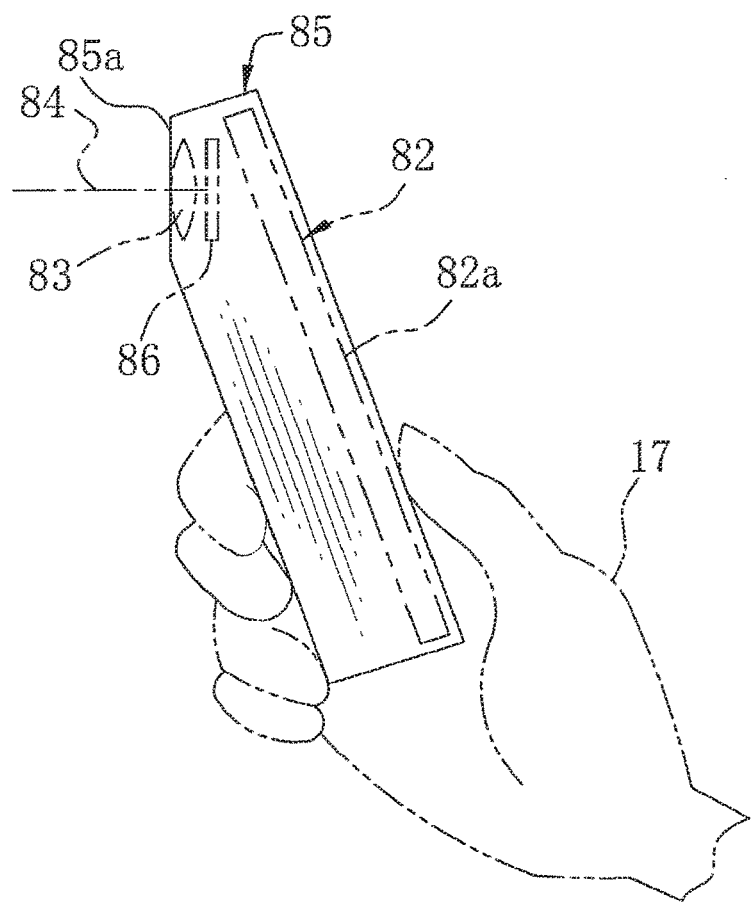

Furthermore, in the above embodiment, the taking lens is provided such that an optical axis is perpendicular to the display screen of the LCD panel; however, as a digital camera 81 shown in FIGS. 6A and 6B, an optical axis 84 of a taking lens 83 may be inclined with respect to a display screen 82a of an LCD panel 82. The taking lens 83 is attached to be inclined such that an imaging surface of the taking lens 83 is directed upward slightly when the display screen 82a parallels the vertical direction in a state that a camera body 85 is in the normal posture. A CCD 86 is also inclined in the same manner as the optical axis 84. A slope 85a is formed in an upper portion of the camera body 85. The taking lens 83 is arranged such that the optical axis 84 becomes perpendicular to the slope 85a.

As shown in FIG. 6B, when the user directs the taking lend 83 toward the subject, the camera body 85 leans forward and a display screen 82a faces upward. That is, when the user holds the digital camera 81 below his/her face, the display screen 82a will face the direction of user's eyes, and it is easily watched. In addition, since the angle of the user's wrist becomes easy, the camera body 85 is easily gripped.

Figure 7:
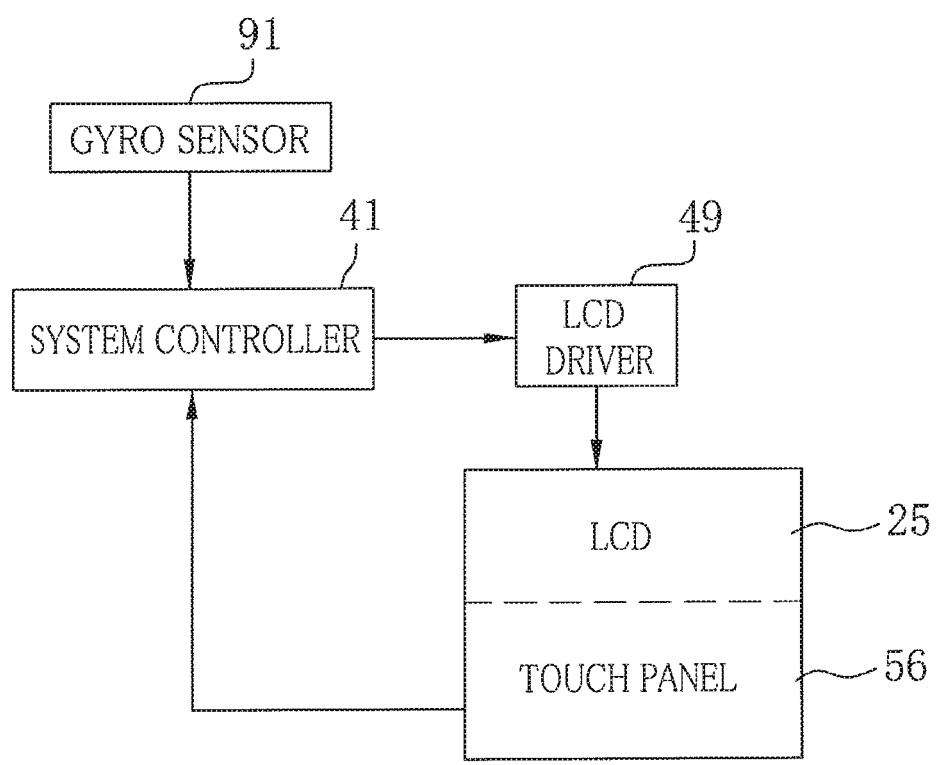
FIG. 7 is a block diagram showing electric structure of the digital camera in which a gyro sensor is used.

In the above embodiment, although the taking mode and the reproducing mode are switched manually by operating the mode switching dial and the like, these modes may be switched automatically according to the posture of the camera body by using a posture detector provided for detecting the posture of the camera body. In this case, the operation mode is set to the taking mode when the posture detector detects that the short side of the camera body is at the top, and it is switched to the reproducing mode when the posture detector detects that the long side of the camera body is at the top. As the posture detector, for example, a gyro sensor (angular velocity detector) 91 as shown in FIG. 7 is used. The system controller 41 controls the display direction on the LCD panel 25 in response to the signal from the gyro sensor 91. Instead of the gyro sensor 91, a switch turned on/off by a swingable weighted lever may be used as the posture detector.

Moreover, in the above embodiment, although the display direction of the image is changed by switching the operation mode, the display direction may be capable of being switched arbitrary. For instance, in some cases, the user desires to turn the camera sideways in the taking mode, while the user desires to turn it upright in the reproducing mode. In consideration of such a case, in both the taking mode and the reproducing mode, the display direction can be made switchable between a first display direction in which the long sides of the display screen and the image are perpendicular to each other and a second display direction in which the long sides of them approximately correspond to each other, so that the image display is made convenient. In this case, an operation member for switching the display direction of the image preferentially may be provided in addition to the operation member for switching between the taking mode and the reproducing mode.

Although the aspect ratio of the image is 4:3 in the above embodiment, it may be other aspect ratio, such as 16:9. In addition, the digital camera for taking the still image is explained in the above embodiment; however, the present invention may be applied to a digital camera capable of taking a moving image in addition to the still image. Moreover, although the digital camera is explained as the example in the above embodiment the present invention may be applied to various kinds of imaging device with display such as a mobile terminal having an image capturing function, such as a cell phone and PDA (Personal Digital Assistance).

In addition, the present invention can be applied to an image display device without the image capturing function such as an image reproducing player for reproducing the still image and the moving image. In case of the image display device, the display direction of the image can be changed in response to the posture of the main body.

Although the LCD is used as the display in the above embodiment, various kinds of display such as a display using an EL (electro luminescence) element, for example can also be used.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An imaging apparatus comprising:
   a single main body having a rectangular solid shape and a flat board shape;
   a display panel provided in a plane of the single main body;
   a touch panel provided on a surface of the display panel; and
   a release button arranged in a side surface of the single main body and configured to be operable in a case where the imaging apparatus is gripped such that a longer side of the single main body stands upright,
   wherein photography is performed by pressing the release button or by pressing a release key displayed on the display panel.

2. The imaging apparatus according to claim 1, having a taking mode for recording an image and a reproducing mode for reproducing the recorded image.

3. The imaging apparatus according to claim 1, wherein the touch panel covers a lower surface of the main body and the release key is displayed in a lower portion of the display panel.

4. An imaging apparatus comprising:
   a single main body having a rectangular solid shape and a flat board shape;
   a display panel provided on a first surface of the single main body;
   a touch panel provided on a surface of the display panel; and
   a release button arranged on a second surface of the single main body, the second surface differing from the first surface.

5. The imaging apparatus according to claim 4, wherein the release button is arranged in a side surface or a front surface of the single main body.

* * * * *